US 12,085,309 B2

United States Patent
Smith et al.

(10) Patent No.: US 12,085,309 B2
(45) Date of Patent: Sep. 10, 2024

(54) VENTILATION SYSTEM WITH TAPERED FLEXIBLE CONDUIT

(71) Applicant: Airscape, Inc., Medford, OR (US)

(72) Inventors: Neil B. Smith, Ashland, OR (US); Richard Jacobi, Grants Pass, OR (US)

(73) Assignee: Airscape, Inc., Medford, OR (US)

( * ) Notice: Subject to any disclaimer, the term of this patent is extended or adjusted under 35 U.S.C. 154(b) by 242 days.

(21) Appl. No.: 16/825,613

(22) Filed: Mar. 20, 2020

(65) Prior Publication Data

US 2020/0300486 A1 Sep. 24, 2020

Related U.S. Application Data

(60) Provisional application No. 62/821,761, filed on Mar. 21, 2019.

(51) Int. Cl.
*F24F 7/06* (2006.01)
*F16L 59/153* (2006.01)
*F24F 7/013* (2006.01)
*F24F 13/02* (2006.01)
*F24F 13/24* (2006.01)

(52) U.S. Cl.
CPC .............. *F24F 7/065* (2013.01); *F24F 7/013* (2013.01); *F24F 13/0218* (2013.01); *F24F 13/0263* (2013.01); *F16L 59/153* (2013.01); *F24F 2013/242* (2013.01)

(58) Field of Classification Search
CPC ........ F24F 7/065; F24F 7/013; F24F 13/0218; F24F 13/0263; F24F 2013/242; F16L 59/153
USPC .......................................................... 454/231
See application file for complete search history.

(56) References Cited

U.S. PATENT DOCUMENTS

| | | |
|---|---|---|
| 2,789,841 A | 4/1957 | Kramer |
| 3,212,529 A | 10/1965 | Ullman et al. |
| 3,216,459 A | 11/1965 | Schreoder et al. |

(Continued)

FOREIGN PATENT DOCUMENTS

WO  WO199427082  11/1994

OTHER PUBLICATIONS

Flexible Ducting Australia, Spiratube Showcase, Dec. 13, 2017, https://web.archive.org/web/20171213194500/https://flexibleducting.com.au/sewn-ducting/spiratube-showcase/ (Year: 2017).*

*Primary Examiner* — Allen R. B. Schult
(74) *Attorney, Agent, or Firm* — Hall Estill Law Firm (57) ABSTRACT

A tapered flexible conduit and a ventilation system incorporating the same. The conduit is arranged to extend between a register and a fan assembly, such as in a whole house fan (WHF) system. The conduit includes a flexible inner liner surrounded by a flexible outer liner. The flexible inner liner has a length of helically formed wire coupled to a flexible membrane. The flexible outer liner includes an insulative layer to provide acoustic baffling for an airflow established by the fan assembly passing through the conduit. The tapered conduit has a frusto-conical shape along an overall length of the conduit to sealingly engage differently sized inlet and exhaust ports of the register and the fan assembly, respectively. The collapsible nature of the respective inner and outer liners reduces bulk during shipment and accommodates a variety of different configurations during installation.

23 Claims, 8 Drawing Sheets

(56) References Cited

U.S. PATENT DOCUMENTS

| | | | |
|---|---|---|---|
| 3,861,423 A * | 1/1975 | Hedges | F16L 25/0009 |
| | | | 138/119 |
| 4,385,550 A | 5/1983 | Steiner et al. | |
| 5,133,579 A | 7/1992 | Anderson et al. | |
| 5,607,529 A * | 3/1997 | Adamczyk | B65H 81/08 |
| | | | 156/190 |
| 6,796,547 B1 | 9/2004 | Washburn | |
| 6,935,379 B1 * | 8/2005 | Buchanan, Sr. | F16L 59/026 |
| | | | 138/167 |
| 7,497,774 B2 | 3/2009 | Stevenson et al. | |
| 8,079,898 B1 | 12/2011 | Stevenson | |
| 8,307,654 B1 | 11/2012 | Liang | |
| 9,344,787 B2 | 5/2016 | Berkman et al. | |
| 10,190,784 B1 | 1/2019 | Rue | |
| 2011/0139289 A1 * | 6/2011 | Qi | B29C 66/919 |
| | | | 138/149 |

\* cited by examiner

VENTILATION SYSTEM WITH TAPERED FLEXIBLE CONDUIT

RELATED APPLICATION

This application makes a claim of domestic priority to U.S. Provisional Patent Application No. 62/821,761 filed Mar. 21, 2019, the contents of which are hereby incorporated by reference.

BACKGROUND

Ventilation systems are used to supply environmentally controlled air to the interior of a structure, such as a residential habitation (e.g., a house) or a commercial establishment (e.g., an office building, a warehouse, etc.). A particularly useful type of ventilation system is sometimes referred to as a Whole House Fan ("WHF") system.

A typical WHF system operates to draw cooler outside air through an interior conditioned space of the structure and into an attic or other unconditioned space, after which the air is vented to the surrounding environment. This allows the structure to be convectively cooled at times when the outside temperature is lower than the inside temperature, such as during overnight and early morning hours. WHF systems can often maintain a desired cool interior temperature with little or no need to operate traditional HVAC (heating, ventilation and air conditioning) equipment, producing significant energy cost savings for a user.

While WHF systems have been found operable in reducing cooling costs and enhancing indoor comfort, there remains a continual need for improved efficiencies with such systems. It is to these and other advancements that the present disclosure is directed.

SUMMARY

Various embodiments of the present disclosure are generally directed to an apparatus and method for supplying ventilation to an interior structure.

In some embodiments, a tapered conduit is provided to channel airflow from an inlet port to an outlet port. The tapered conduit includes a flexible inner liner and a flexible outer liner. The flexible inner liner has a length of helically formed wire coupled to a flexible membrane. The helically formed wire takes a frusto-conical path so that the flexible inner liner has a continuously decreasing innermost diameter and tapers in cross-sectional area along an overall length thereof. The flexible outer liner includes a layer of flexible material that continuously tapers in cross-sectional area along a length thereof. The flexible outer liner is configured to cover the flexible inner liner to provide acoustic baffling for the airflow passing along the tapered conduit.

In related embodiments, an apparatus includes a fan assembly, a register and a tapered conduit. The fan assembly has an electric motor, an exhaust port, and a series of rotatable impellers to establish an air flow through the exhaust port. The register has a base portion configured to extend through a boundary of a structure that separates a conditioned space and an unconditioned space. The register further includes an inlet port coupled to the base portion, with the inlet port having a different cross-sectional area as compared to the exhaust port. The tapered conduit is arranged to extend from the inlet port of the register to the exhaust port of the fan assembly to direct the airflow therebetween. The tapered conduit includes a flexible inner liner surrounded by a flexible outer liner. The flexible inner liner has a length of helically formed wire coupled to a flexible membrane. The flexible outer liner has a layer of flexible material that provides acoustic baffling for the airflow passing along the tapered conduit. The tapered conduit is provided with a frusto-conical shape that extends along an overall length of the conduit to accommodate attachment to the respective exhaust and inlet ports.

These and other features and advantages of various embodiments can be understood with a review of the following detailed description in conjunction with a review of the accompanying drawings.

DETAILED DESCRIPTION

Various embodiments are generally directed to improvements to ventilation systems, including but not limited to a Whole House Fan (WHF) system. As explained below, some embodiments provide the ventilation system with a register in a ceiling of a structure at a boundary (ceiling) between an interior of the structure, such as a residential space, and an upper area of the structure, such as an attic. The register may be sized to fit between adjacent ceiling joists, and may have moveable vanes that automatically open when the system is operational and close to seal off the attic when the system is deactivated.

A fan is supported at an appropriate clearance location within the attic above the register. The fan may take the form of a low powered, high efficiency WHF having an electric motor which rotates a number of fins (impeller blades) about a central axis to generate a desired airflow rate.

A tapered flexible conduit (or "duct") provides a nominally fluid tight passageway between the register and the fan. The conduit can be any suitable length, such as on the order of from around four (4) to eight (8) feet, to allow the fan and the register to be respectively located at optimum locations. Mounting the fan away from the register in this manner provides certain advantages, including reductions in noise since the fan motor is mechanically decoupled from the framework of the structure, and enhanced efficiency since the fan can be positioned in a location that can generate enhanced airflow within the attic space.

It is contemplated that the register has a first overall outermost diameter (OD) at an outlet connection port. The fan has a second overall OD at an inlet connection port. While not limiting, it is contemplated that the first OD of the register will be smaller than the second OD of the fan. Both the outlet port of the register and the inlet port of the fan may be circular in shape, or may take other cross-sectional shapes.

The conduit is continuously tapered so as to have a first end with a first innermost diameter (ID) sized to mate with the first OD of the register, and a second end with a second ID sized to mate with the second OD of the fan. In one embodiment, the conduit is nominally seven (7) feet in expanded length and has respective first and second IDs of nominally 20 and 24 inches, which generally correspond to the respective sizes of the register and fan. Other respective sizes can be used.

The conduit is contemplated as comprising a two-piece unit with two main elements: an inner liner (or "collapsible shell") and an outer liner (or "insulative sleeve").

The inner liner comprises a wire wound in a helical shape with a plurality of turns, each successive turn having a slightly smaller OD as compared to the previous turn. This provides the inner liner with a frusto-conical tapered shape bounded by first and second IDs. Bonded to the helical wire is a thin layer of flexible material. Any suitable flexible material may be used. For sound deadening and airflow purposes it is contemplated that the flexible material may be a non-permeable material, but such is not necessarily required.

The outer liner may comprise an inner liner of insulation bonded to an outer non-permeable layer. The insulation layer serves to provide the conduit with thermal and/or acoustic insulating capabilities, and the outer non-permeable layer retains the airflow directed through the conduit from the register to the fan.

The inner liner may be expanded to an extended orientation and collapsed to a retracted orientation as required. The total amount of length reduction will depend on a number of factors including the extended length, the diameter of the wire, the number of turns in the helical coil, the relative diameter of the respective turns, the flexibility and thickness of the inner liner material, etc.

In some cases, the flexible inner liner can be collapsed to an overall length of less than 50% of the extended length. In other cases, the flexible inner liner can be collapsed to an overall length of from about 12% to about 25% of the extended length. In still other cases, the flexible inner liner can be collapsed to an overall length of less than 12% of the extended length. The ability of the inner liner to be collapsed provides a number of operational advantages. These advantages include reduced shipping costs through reduced packaging volume, flexibility in routing of the conduit during installation, and improved ability to maintain the desired conduit shape during the operational life of the system.

The outer liner is sized to slide onto or otherwise be attached to the inner liner. By sliding the larger end of the outer liner onto the smaller end of the inner liner, the outer liner can easily slip onto the length of the inner liner to mate these respective elements. Because of the tapered nature of the inner and outer liners, the outer liner will not tend to catch onto the inner liner.

In some embodiments, the outer liner is a closed, tapered sleeve that maintains the desired frusto-conical shape for the conduit once installed. In other embodiments, the outer liner is supplied as a planar sheet that is wrapped around the inner liner. Opposing edge surfaces of the planar sheet are adjoined using a suitable fastening mechanism, such as a zipper, hook and loop fasteners, snaps, etc. It will be appreciated that while the inner liner may be easily collapsed to a fraction of its extended length, the bulkiness of the outer liner limits the ability to collapse the outer liner in the longitudinal direction (e.g., the axis along which the tapered flexible conduit extends). Instead, for shipment and storage purposes, the outer liner can be folded or otherwise collapsed into a compact volume.

Nevertheless, the outer liner is sufficiently flexible to allow the conduit to be bent or otherwise routed as required to achieve the desired coupling between the register and the fan while retaining the desired tapered internal cross-sectional area along the fluidic path. Moreover, because the outer liner essentially constitutes a sleeve (e.g., a "sock"), the outer liner may be rolled, folded or otherwise collapsed into a suitably small area to allow the collapsed outer liner to be slipped into the interior of the collapsed inner liner for packaging and shipment of both the inner and outer liners as a single compact unit.

Attachment mechanisms such as metal or flexible tabs can be provided at the respective ends of the inner and/or outer liners to enable attachment of the inner liner to the outer liner at each end, as well as attachment of the conduit to the respective register and fan connection ports. This ensures that the inner and outer liners, once adjoined together, maintain the tapered flexible conduit as a one piece unit that is light and easy to manipulate.

Figure 1:
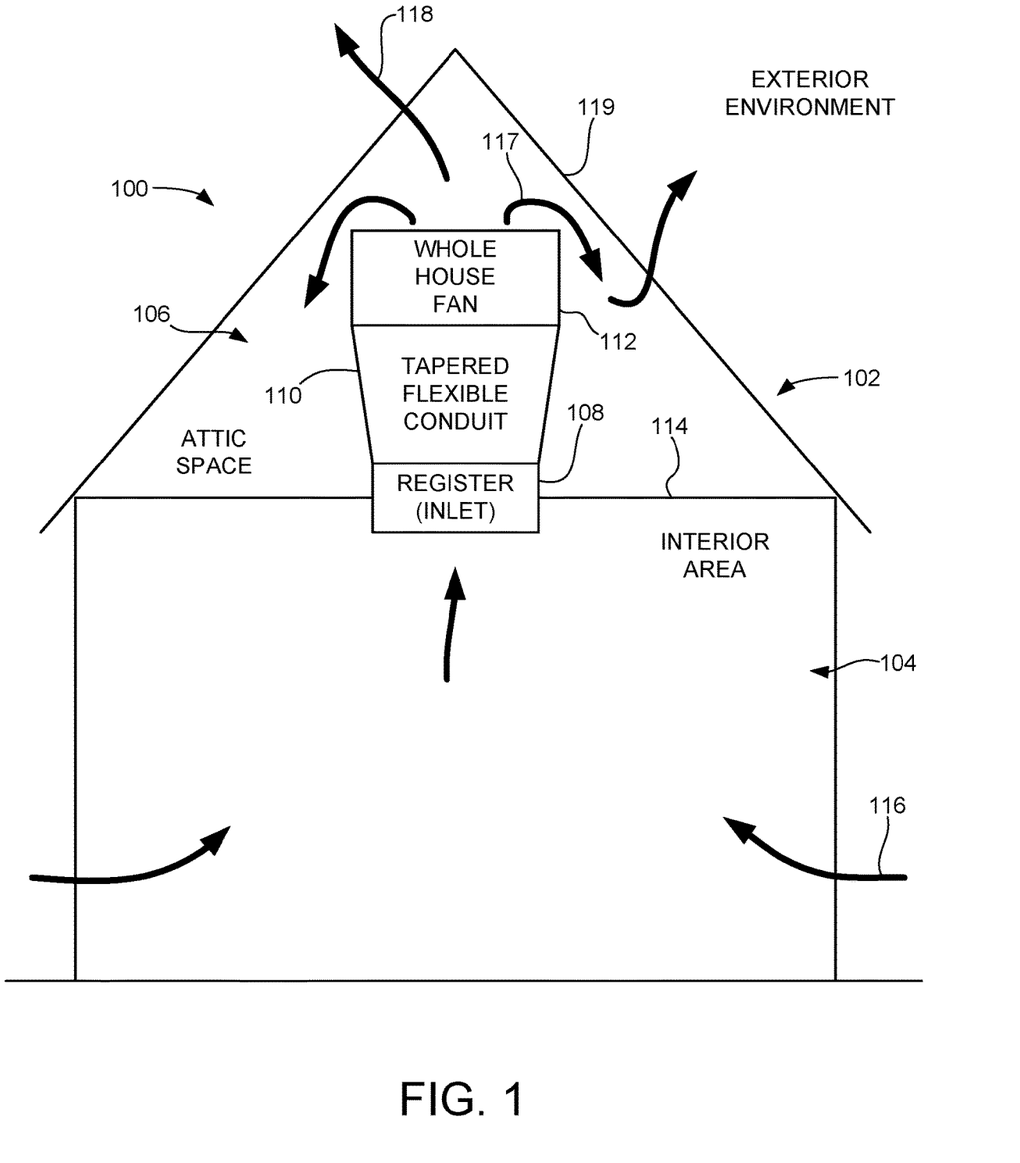
FIG. 1 is a schematic depiction of a ventilation system constructed and operated in accordance with various embodiments of the present disclosure.

These and other features and advantages of various embodiments can be understood beginning with a review of FIG. 1 which provides a simplified schematic representation of a ventilation system 100 for use in controlling the internal environment of a building structure 102.

For purposes of providing a concrete illustration, it is contemplated that the ventilation system is a whole house fan (WHF) system and the structure is a residential structure (e.g., a house). Other applications for the various embodiments presented herein are contemplated, however, and will readily occur to the skilled artisan upon review of the present disclosure. These and other applications can include other configurations in a residential setting (including the utilization of an unconditioned interior space such as an attached garage), other configurations in a commercial environment (e.g., an office building, a workshop, a warehouse, etc.).

The structure 102 is divided between two main spaces, or areas: an interior area 104 and an attic space 106. The interior area may comprise one or more rooms on one or more floors adapted for normal human habitation (e.g., kitchen, living room, bedrooms, bathrooms, hallways, etc.). As such, the interior area 104 is referred to as a conditioned space, and may be serviced by an HVAC system (not separately shown).

The attic space 106 extends above the interior area and may serve as a storage space for the humans occupying the interior area 104. As such, the attic space is referred to as an unconditioned space. Different levels of insulation, fit and finish, etc. will tend to exist between the interior area and the attic in a manner well known to the reader. It will be appreciated that the WHF system 110 can be alternatively configured to ventilate to other unconditioned spaces, including but not limited to an attached garage, workshop, etc.

The ventilation system 100 includes a register (inlet) 108, a tapered flexible conduit 110, and a fan (WHF) 112. The register 108 is disposed to extend through a ceiling boundary 114 between the interior area 104 and the attic space 106. The fan 112 is supported within the attic space 106 at a suitable location with adequate clearance and air flow. The conduit 110, as explained below, provides fluidic communication between the register 108 and the fan 112.

The ventilation system 100 is operated at times when the outside temperature of the external environment is lower than the temperature of the interior area 104, and it is desirable to apply cooling to the structure 102. Depending on the climate, this may include periods of operation during Spring, Summer and/or Fall as required.

During operation, the fan 112 is activated and the register 108 is opened. This draws in outside airflow, as indicated by arrows 116, through various apertures in the interior area (e.g., open doors, windows, vents, etc.). The inlet airflow 116 is drawn slowly to collect heat from the interior area and to flow up through the register 108.

This airflow is directed, by the conduit 110, from the register 108 to the fan 112. The fan exhausts the heated airflow (represented by arrows 117) into the attic space 106. This operation has the advantage of drawing the heat from the interior area into the attic space. Because the fan establishes a positive pressure within the attic space that is greater than the pressure of the exterior environment, at least a portion of the airflow (arrow 118) is vented through various vent apertures in a roof 119 of the structure.

Electronic controls (not separately shown) may be configured to automatically detect the differential temperatures between the interior and external environments, and automatically activate the ventilation system 100 at appropriate times. The register may have motorized vanes (not separately shown) that can be moved between closed and open positions so that the attic is sealed off from the interior area when the ventilation system is in a deactivated state.

Figures 2, 3:
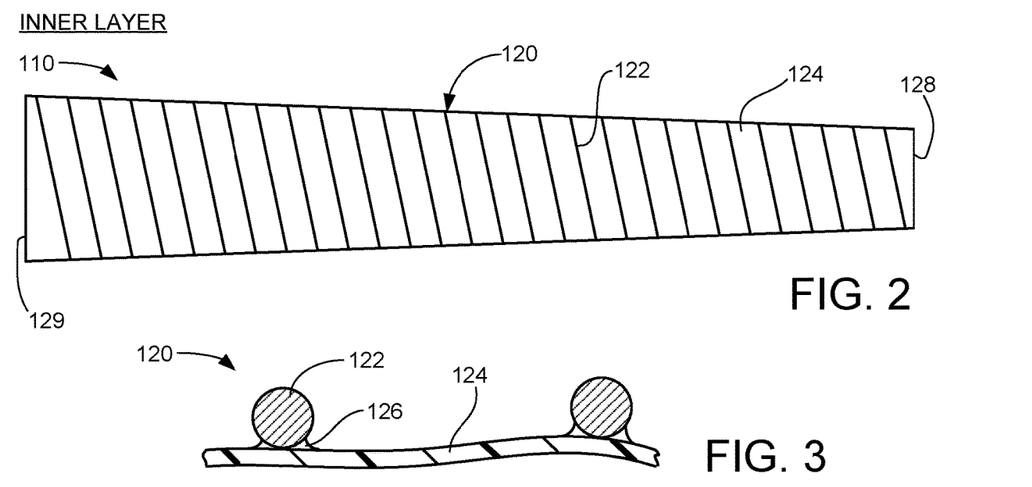
FIG. 2 shows a side elevational depiction of an inner liner of a tapered flexible conduit of the system of FIG. 1 in some embodiments.
FIG. 3 shows a partial cross-sectional view of a portion of the inner liner of FIG. 2 in some embodiments.

FIG. 2 is a side elevational schematic representation of aspects of the tapered flexible conduit 110. A flexible inner liner 120 forms an interior portion of the conduit 110. As further shown in FIG. 3, the inner liner 120 comprises a helical coil 122 formed of wire that takes a frusto-conical (cone) shaped path with a continuously reduced cross-section. Bonded to the coil 122 is a thin layer (membrane) 124 of flexible material that, in combination with the wire, provides the inner liner 120 with a frusto-conical shape. The layer 124 may be a permeable material (e.g., cloth, etc.) that allows a portion of the airflow to pass through the layer, or may be a non-permeable material such as a polyester film (e.g., mylar, etc.), rubber, plastic, etc. that restricts passage of airflow through the layer.

Figures 4A, 4B:
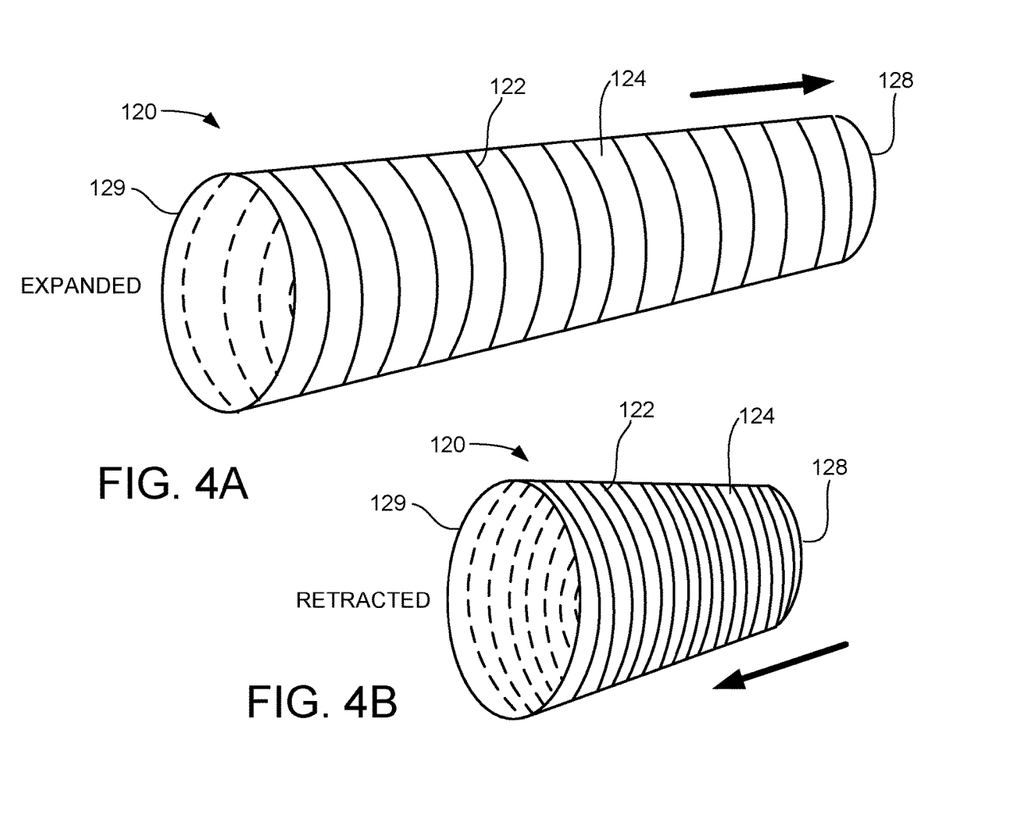
FIGS. 4A and 4B are respective isometric depictions of the inner liner in respective expanded and retracted orientations.

The flexible nature of the coil 122 and layer 124 are such that the conduit 120 can be transitioned (e.g., stretched and collapsed) between an expanded orientation, as shown in FIG. 4A, and a retracted orientation, as shown in FIG. 4B. The coil 122 can be affixed to an interior or exterior surface of the layer 124. In other embodiments, the coil can be sandwiched between two or more laminated layers. Other configurations can be utilized as well.

The inner liner 120 has a smaller first end 128 and a larger second end 129. The smaller first end 128 is adapted for a substantially airtight fluidic coupling to the register 108, and the larger second end 129 is adapted for a substantially airtight fluidic coupling to the fan 112. This arrangement is not necessarily required; in other cases, the smaller end may be affixed to the fan and the larger end may be affixed to the register.

A larger diameter fan tends to provide certain advantages including greater efficiency, larger sustained airflow (e.g., greater CFM), etc. On the other hand, the register may be limited to a size that can be placed between or among existing structural members such as spaced-apart joists. A common residential construction spacing is nominally around 16 inches between the centers of adjacent joists, so some registers 108 may be adapted to fit in this intervening space.

Hence, while the tapered conduit can be configured to work with substantially any respective fan and register sizes, in most cases the fan will be larger than the register and the conduit will get larger in a direction toward the fan and smaller in a direction toward the register. It will be appreciated that none of the drawings presented here are necessarily drawn to scale, so the amount of tapering between the respective ends 128, 129 in a given application may be different from that shown in the drawings.

In one embodiment, the conduit 120 has an expanded length of nominally seven (7) feet, a first end with an internal circular diameter of nominally 20 inches, and a second end with an internal circular diameter of nominally 24 inches. In this way, the conduit 120 operates as a continuous reducer (or expander) over the length thereof. Other overall lengths and rates of reduction in cross-sectional size can be used as desired. For example, other embodiments may provide an expanded length of from four (4) to eight (8) feet, a smaller interior diameter of from around 16 inches or less to 22 inches or more, and a larger interior dimeter of from around 20 inches or less to 28 inches or more.

Figure 5A:
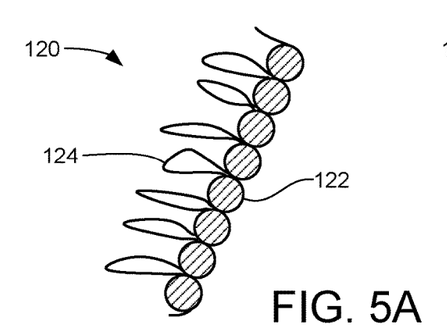
FIGS. 5A and 5B show cross-sectional representations of portions of the inner liner in a fully collapsed orientation in accordance with different tapering rates.
Figure 5B:
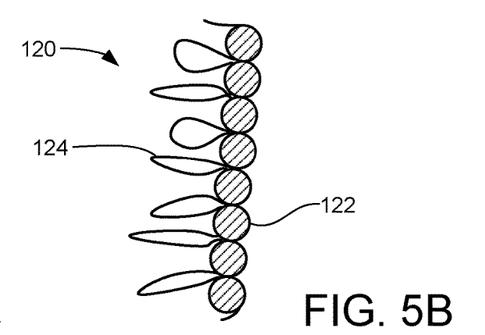

The collapsible nature of the inner liner 120 is depicted in FIGS. 5A and 5B, which shows different configurations for the inner liner in some embodiments. FIG. 5A shows each turn in the helical coil 122 to have a reduced cross-sectional diameter at a first rate that is greater than that in FIG. 5B. While it is contemplated that the inner coil may be fully collapsible so that each coil turn is immediately adjacent, such is not necessarily required; in other embodiments, the inner liner may be only collapsible a moderate amount (such as 50%) as compared to its extended length.

Figure 6:
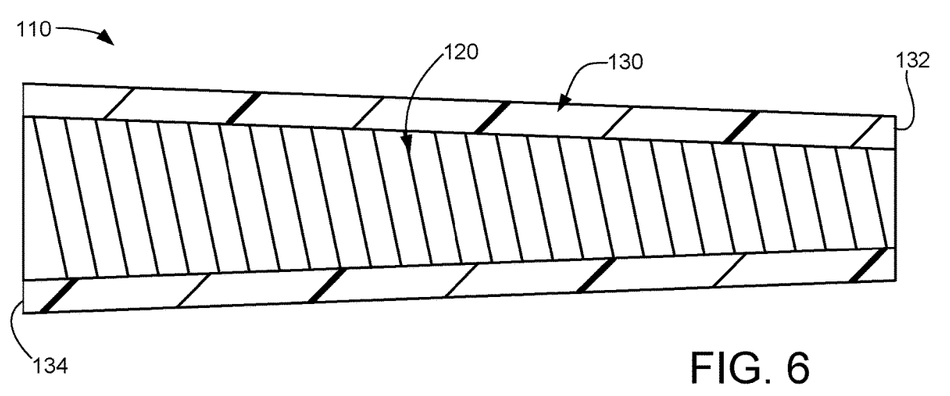
FIG. 6 shows a partial cross-sectional view of the tapered flexible conduit in which an outer liner has been configured to surround the inner liner in some embodiments.

FIG. 6 shows the tapered flexible conduit 110 from FIG. 1 in further detail. An outer liner 130 is configured to surround the inner liner 120. The inner and outer liners 120, 130 cooperate to retain the internal airflow at efficient flow levels and low pressure drops while providing sound deadening characteristics so that fan noise and vibrations are not transmitted through the register to the interior of the structure.

The outer liner 130 has a frusto-conical shape that closely matches the shape of the inner liner 120. To this end, the outer liner 130 has a smaller first end 132 configured for mating to the register and a larger second end 134 configured for mating to the fan.

Figure 7:
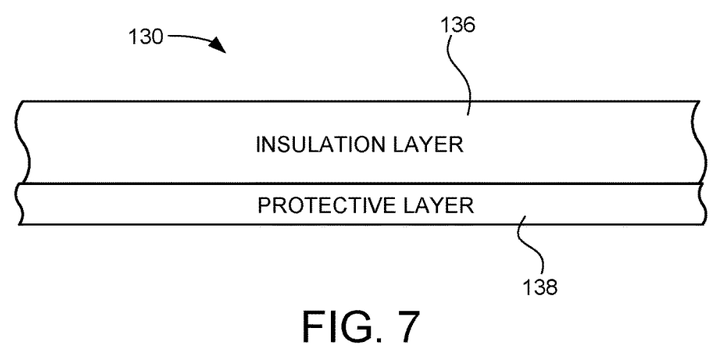
FIG. 7 is a schematic representation of different layers of material that may be utilized in the outer liner of FIG. 6 in some embodiments.

As shown in FIG. 7, the outer liner 130 includes an insulation layer 136 and a protective layer 138. Additional layers can be applied as required. While not limiting, it is contemplated that the insulation layer 136 will be sandwiched between the interior layer 124 of the inner liner 120 (see FIG. 3) and the protective layer 138 of the outer liner 130 (FIG. 7).

Any suitable materials can be used to form the outer liner 130; for example, the insulation layer 136 can incorporate batting, cloth, fibers, plastic, rubber, foam, thermal insulation material, or any other material or combination of materials that provide suitable acoustic and/or thermal baffling characteristics. The exterior layer 138 can incorporate mylar, plastic, metal foil, rubber or any other material or combination of materials that serve to provide fluidic channeling and protective characteristics.

It is contemplated that the protective layer 138 will be a non-permeable material, but such is not necessarily required; other suitable materials include cloth, etc. can be used. Nevertheless, it may be desirable that at least one, or both, of the respective layers 124 and 138 be non-permeable material. In an alternative embodiment, the outer liner 130 can be formed of homogenous layer of material (e.g., a conically shaped rubber sheaf, etc.). In still other embodiments, a laminate having more than two layers can be used to form the outer liner.

Figure 8:
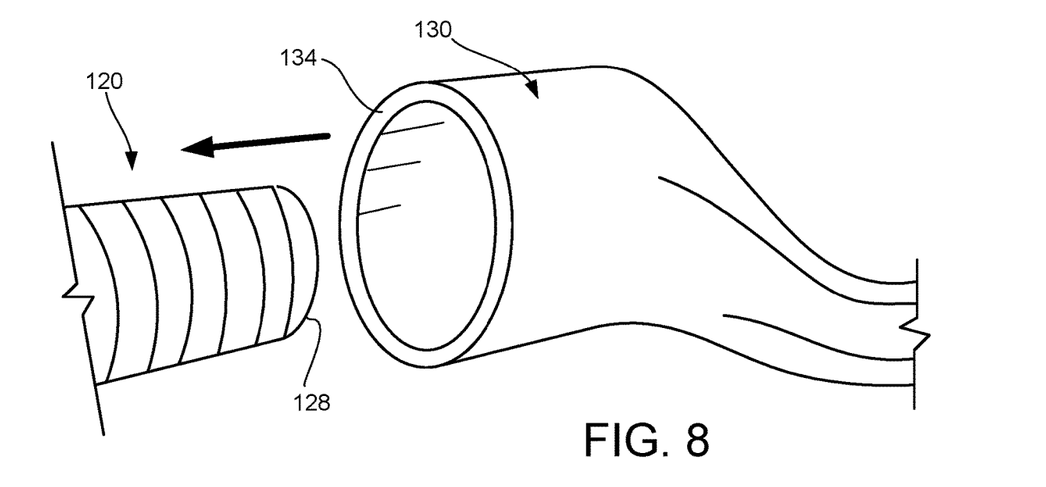
FIG. 8 shows the outer liner as a closed tapered sleeve configured to slide onto the inner liner to produce the configuration of FIG. 6.
Figure 9:
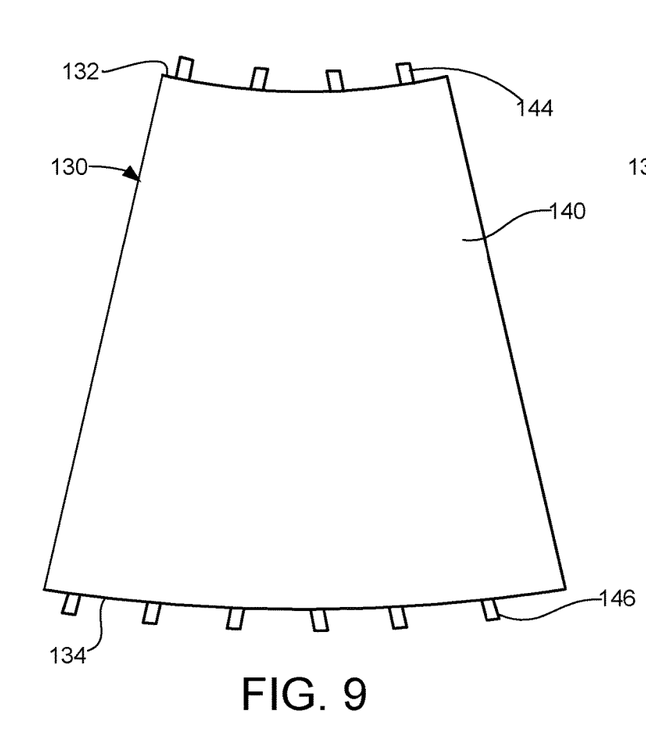
FIG. 9 shows the outer liner as an open planar piece of material that is wrapped around the inner liner to produce the configuration FIG. 6.
Figure 10:
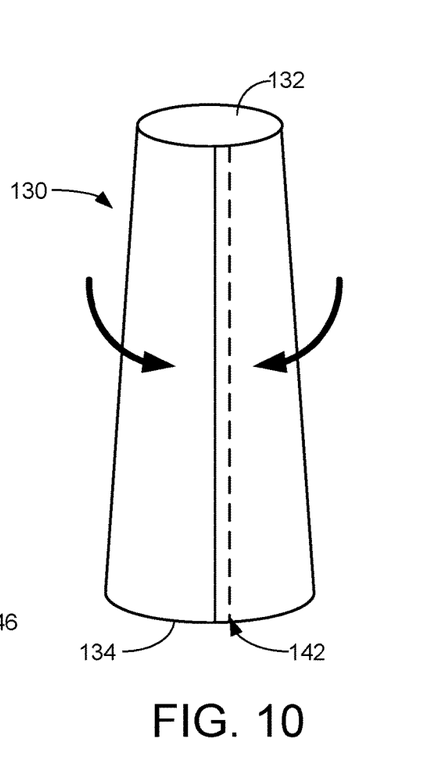
FIG. 10 shows the use of a fastener mechanism to secure the outer liner into its final shape of FIG. 6 in some embodiments.

The outer liner 130 can be arranged as a closed tapered sleeve as shown in FIG. 8. In this way, the larger end 134 of the outer liner 130 can be slipped onto the smaller end 128 of the inner liner 120 like a sock. In other embodiments, the outer liner 130 may be arranged as an open planar sheet 140 that can be wrapped around the inner liner 120, as shown in FIGS. 9 and 10. A fastening mechanism 142 can be used to adjoin the opposing edges of the planar sheet 140 (FIG. 10). The fastening mechanism 142 can take any variety of forms including a zipper, a hook and loop fastener, a series of snaps, etc. Retention tabs 144, 146 (FIG. 9) may be provided at the respective ends 132, 134 of the outer liner 130 to interconnect with the respective ends 128, 129 of the inner liner 120 and maintain the inner liner 120 in the desired configuration within the outer liner 130.

Figures 11A, 11B, 11C:
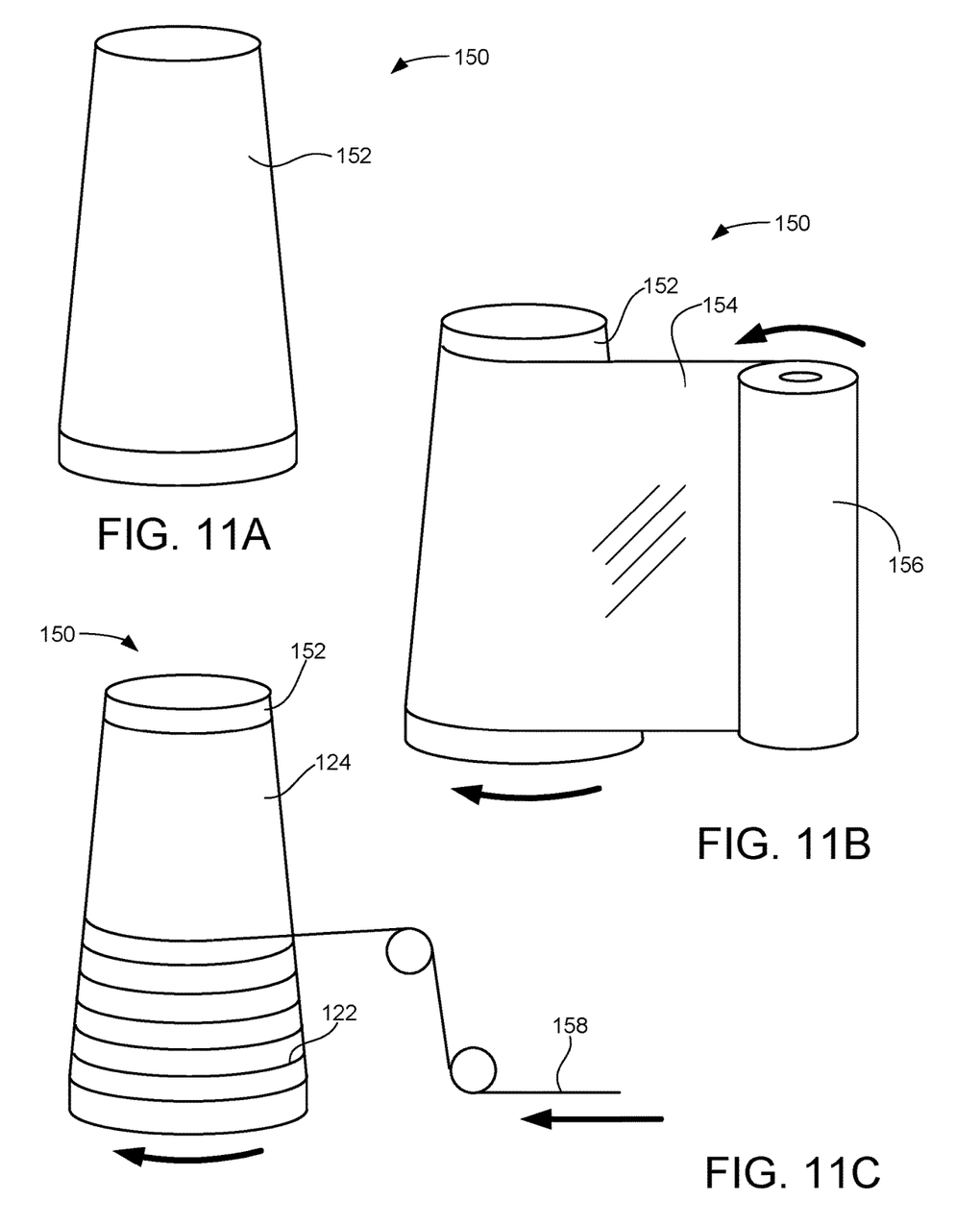
FIGS. 11A through 11C show a methodology in which the inner liner may be advantageously constructed in accordance with some embodiments.

FIGS. 11A through 11C illustrate a sequence whereby the inner liner 120 may be fabricated in some embodiments. Other sequences may be used so these are merely for purposes of illustration and are not limiting. As shown in FIG. 11A, a form (last) 150 is provided with an outermost frusto-conical surface 152 sized to correspond to the dimensions of the inner liner 120.

As shown in FIG. 11B, a sheet of material 154 is wrapped around the outer surface 152 from a roll dispenser 156. The material 154 corresponds to the flexible thin layer 124 of FIG. 3. In FIG. 11C, coils of wire 158 are wrapped around and onto the material 154 at the desired spacing using a wire dispenser to form the helical coil 122. Subsequent processing such as glue or heat bonding is applied to secure the wire to the material. It will be noted that while the wire has been shown to extend on the outside of the material, other arrangements can be used such as placement of the wire on the inside of the material, the use of multiple material layers, sandwiching the wire between opposing material layers, etc.

Figure 12A:
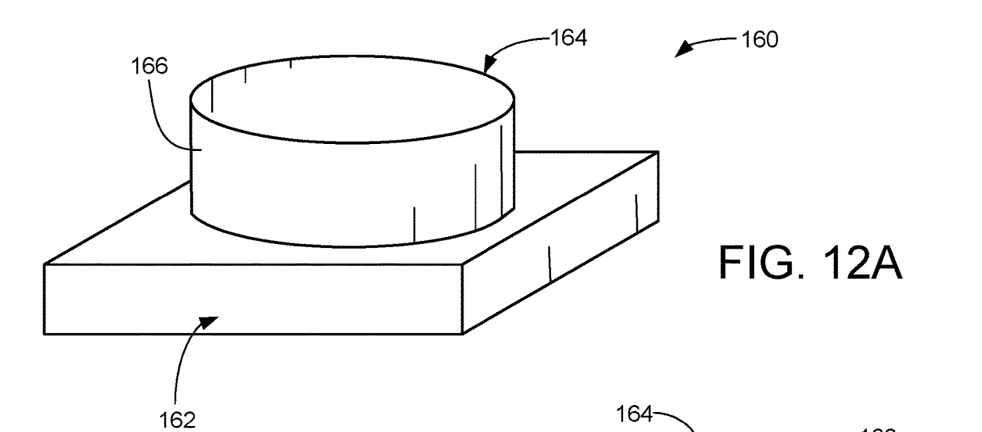
FIGS. 12A and 12B show respective isometric depictions of the register of FIG. 1 in some embodiments.
Figure 12B:
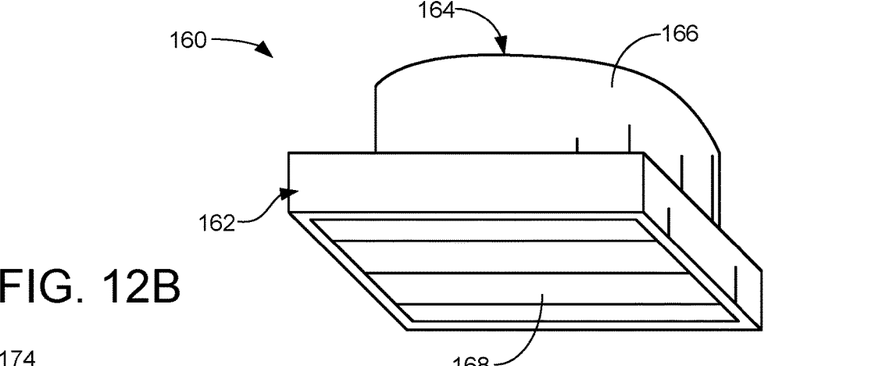

FIGS. 12A and 12B show a register 160 generally corresponding to the register 108 in FIG. 1 in accordance with some embodiments. Other arrangements can be used. The register 160 has a rectilinear (rectangular) base portion 162 and a cylindrical outlet port 164. The port 164 has a cylindrical outer surface 166 configured to slide within the smaller end 128 of the inner liner 120 and smaller end 132 of the outer liner 130.

As depicted in FIG. 12B, the register 160 further has a number of controllably movable vanes 168. The vanes can be transitioned between an open position to permit the ingress of air from the interior area and a closed position to close off the ingress of air from the interior area. A motor driven actuation system may be included to automatically transition between the closed and open positions.

Figure 13:
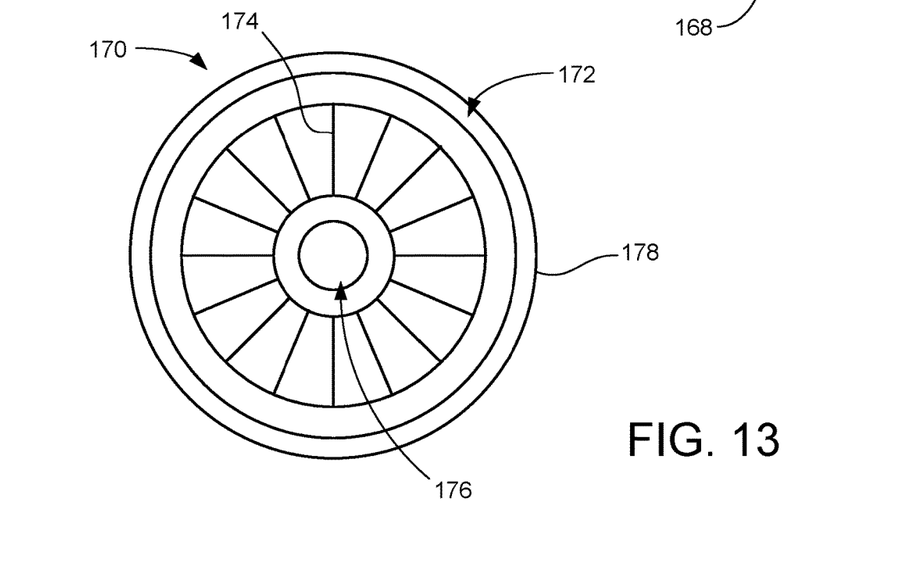
FIG. 13 is a front facing depiction of the whole house fan of FIG. 1 in some embodiments.

FIG. 13 is a front facing view of a fan 170 generally corresponding to the fan 112 in FIG. 1. The fan 170 includes an outermost housing 172 which encloses a series of fan impellers 174 that are rotated by an electric motor 176 to establish a desired airflow. The housing 172 serves as an inlet port and includes a cylindrical outer surface 178 configured to slide within the larger end 129 of the inner liner 120 and the larger end 134 of the outer liner 130.

While the register and fan ports 164, 172 will be sized to nominally allow the tapered flexible conduit 110 to nominally slip onto these ports, manufacturing variations and other factors may give rise to situations where a small mismatch occurs. For example, instead of providing the fan with a nominal OD of 20 inches, an actual fan may be slightly larger, such as 20¼ inches. The tapered nature of the conduit 110 allows an installer to trim off an appropriate amount of the end of the conduit until the desired interior diameter is reached, after which the appropriately sized end can be slipped onto the fan and establish a fluid-tight seal. Similar adjustments can be made to handle variations in register sizes. To accommodate these and other considerations, in some cases the larger end of the conduit may be made slightly larger than needed and the smaller end of the conduit may be made slightly smaller than needed.

As noted above, the register and fan ports 164, 172 in FIGS. 12A, 12B and 13 each have a cylindrical shape. This allows the circular ends of the tapered conduit 110 to slip onto these respective elements to establish a substantially fluid tight seal at each end. A suitable fastening mechanism (e.g., tape, adhesive, clamps, threaded fasteners, etc.) can be applied to secure each end of the conduit to the respective port.

Figure 14:
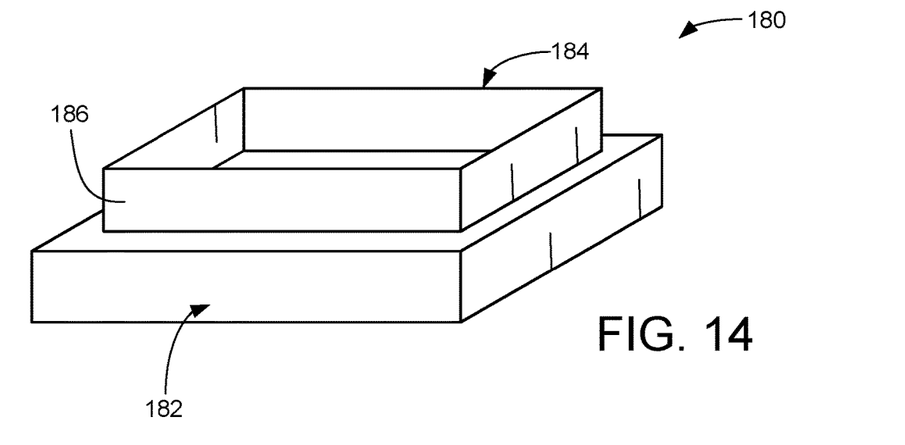
FIG. 14 shows an isometric depiction of the register of FIG. 1 in further embodiments.

It is contemplated that some installation environments may have a register and/or a fan port that is not cylindrically shaped. Instead, one or both of these ports may have some other shape, such as a rectilinear (rectangular) shape. To this end, FIG. 14 shows another register 180 generally similar to the registers 108, 160 discussed above. The register 180 has a rectilinear base portion 182 and a rectilinear outlet port 184. The port 184 has four (4) flat outer surfaces 186. In the present example, the rectangular cross-sectional opening through the port 184 is square (e.g., each outer surface 186 is the same size). Other shapes can be accommodated including an elongated configuration (e.g., two of the outer surfaces may be longer than the remaining two surfaces), an oval configuration, etc.

Figure 15:
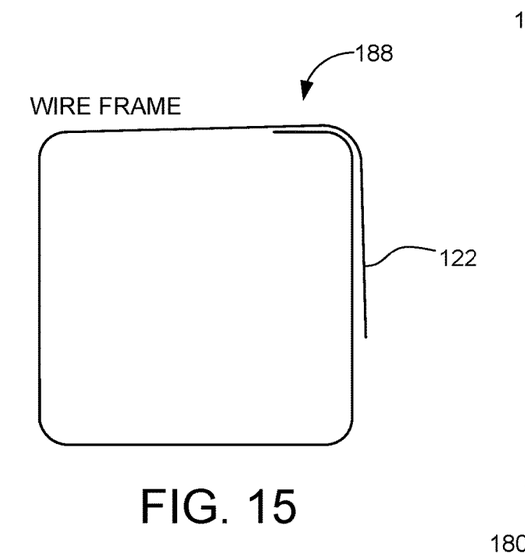
FIG. 15 illustrates a rectilinear wire frame formed from a selected end of the coil portion of the inner liner.

To enable the inner liner 120 of the tapered conduit 110 to mate with the outlet port 184, the circular turns of the coil 122 can be bent by the installer into a matching wire frame 188, as generally represented in FIG. 15. A suitable number of turns can be shaped into the wire frame to accommodate the protrusion length of the port.

Figure 16:
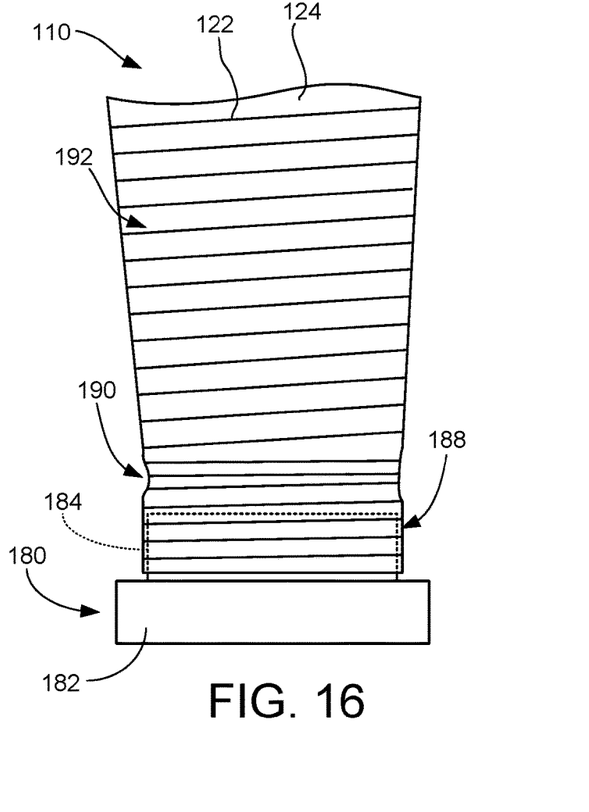
FIG. 16 shows mating engagement of the wire frame from FIG. 15 onto the register of FIG. 14 during installation of the tapered conduit.

As generally depicted in FIG. 16, the write frame 188 can be slipped onto and attached to the rectilinear port 184. A short transition portion 190 will extend from the wire frame 188, allowing the conduit 110 to transition from a square shape to a tapered, frusto-conical shape 192 along a remaining extent of the conduit. While the outer liner is not shown in FIG. 16, it will be understood that, as described above, the outer liner can be installed onto the inner liner either before or after the wire frame 188 is attached to the rectilinear port 184.

Figure 17A:
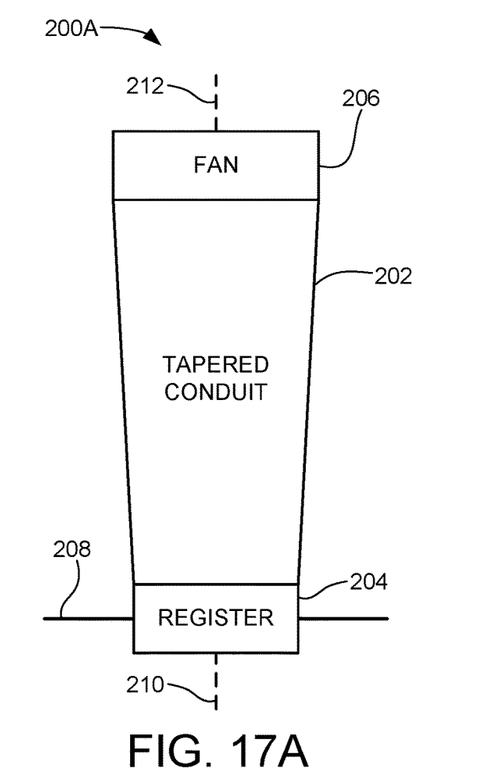
FIGS. 17A through 17C illustrate different ventilation system configurations that utilize the tapered conduit in accordance with various embodiments.
Figure 17B:
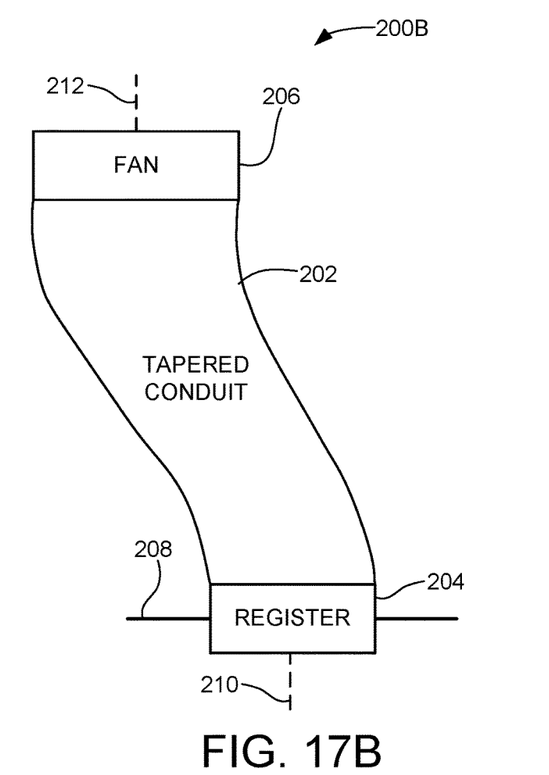
Figure 17C:
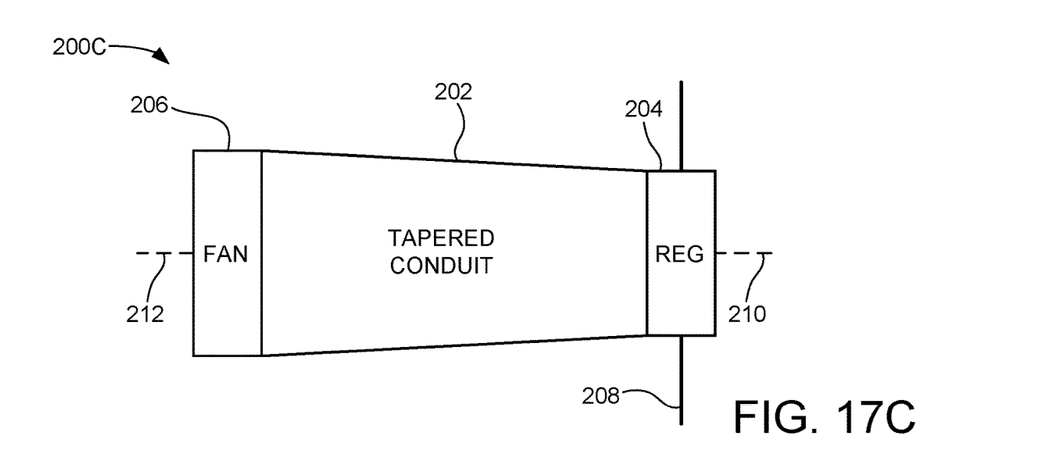

FIGS. 17A-17C show respective ventilation system configurations that can be realized using a tapered conduit constructed and operated in accordance with various embodiments. FIG. 17A shows a first ventilation system 200A with a tapered conduit 202, a register 204 and a fan 206. The register 204 extends through a horizontally extending structural boundary 208, such as a ceiling that separates an interior space from an attic. These respective elements generally correspond to similar elements discussed above.

The ventilation system 200A takes a vertical, axially aligned configuration so that the fan 206 is suspended directly above, and in line with, the register 204. More particularly, axis 210 represents a centerline of the register port, and axis 212 represents a centerline of the fan port. The axes 210, 212 are colinear and extend along the same overall axial line of the conduit 202.

FIG. 17B shows a vertical, axially offset configuration so that the fan 206 is up and off to the side of the register 204. This causes the conduit 202 to be routed along a continuously curving, serpentine (e.g., S-shaped) path. The flexibility of the conduit allows both the register and the fan to be separately placed in optimal locations.

For example, it is contemplated that the register 204 in FIG. 17B has been placed in a desired location to fit between a pair of adjacent joists or other structural members (not separately shown) in the boundary 208. The fan 206 has been offset under an overhead truss member (not separately shown) which supports the fan using a chain, a set of straps, or some other suitable mounting mechanism.

While vertical orientations for the conduit have been illustrated in the drawings, the conduit has sufficient rigidity in a plane transverse to the direction of airflow (e.g., orthogonal to axes 210, 212) that the conduit can be installed in any desired orientation.

To this end, FIG. 17C provides a ventilation system 200C with a horizontal, axially aligned configuration. In this case, the register 204 extends through a vertically extending boundary 208 such as a wall adjacent a walk-in attic space, a garage, etc. The fan 206 and the conduit 202 can be secured and supported as needed.

It follows that the flexible nature of the tapered conduit 110 allows mating with any number of different port sizes, shapes and mounting locations without the need for the use of a reducer or other transition member to accommodate changes in size (e.g., larger to smaller diameter) or shape (e.g., square to round, etc.). The tapered conduit can be trimmed at either end to obtain an inner circumference that meets the needs of substantially any installation environment. This includes the installation of a new ventilation system as well as the retrofitting of an existing ventilation system.

It will now be appreciated that the tapered flexible conduit as embodied herein can provide a number of benefits over the existing art, including efficiencies that can be realized during manufacturing, shipment, installation and operation.

While the various embodiments have contemplated the environment of a whole house fan (WHF) system in a residential structure, other applications may be used as well, including but not limited to commercial structures, industrial applications, etc.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method of forming a tapered conduit configured to be installed at a destination location to interconnect an inlet port and an outlet port, the method comprising:
routing a wire along a helically shaped path to provide a helically formed wire having a succession of turns of successively different diameters;
attaching a first layer of flexible material to the helically formed wire to provide a flexible inner liner having a frusto-conical shape, the flexible inner liner expandable along a longitudinal axis from a maximum expanded length to a minimum retracted length;
forming a flexible outer liner comprising a second layer of flexible material shaped to surround and conform to the frusto-conical shape of the flexible inner liner;
collapsing the flexible inner liner to the minimum retracted length;
folding the flexible outer liner into a compacted volume; and
inserting the folded flexible outer liner into an interior of the collapsed flexible inner liner to place the flexible inner liner and the flexible outer liner in a space-saving, collapsed shipment orientation for shipment to the destination location.

2. The method of claim 1, wherein the routing step comprises wrapping the wire around a rotatable last having a frusto-conical shape corresponding to the frusto-conical shape of the flexible inner liner.

3. The method of claim 1, wherein the tapered conduit is subsequently installed at the destination location by steps comprising:
receiving the flexible inner liner and the flexible outer liner in the space-saving, collapsed shipment orientation;
removing the flexible outer liner from the interior of the flexible inner liner;
expanding the flexible inner liner to an installation length corresponding to a separation distance between the first and second ports;
mechanically attaching a first end of the flexible inner liner to the first port;
mechanically attaching an opposing second end of the flexible inner liner to the second port; and
surrounding the flexible inner liner with the flexible outer liner to thermally and acoustically insulate the flexible inner liner.

4. The method of claim 1, wherein the flexible outer liner further comprises an insulating layer of material.

5. The method of claim 1, further comprising shipping the flexible inner liner and the flexible outer liner in the space-saving, collapsed shipment orientation to a party associated with the destination location.

6. The method of claim 1, wherein the flexible outer liner is characterized as a closed tapered sleeve having a larger end and a smaller end, the larger end of the flexible outer liner configured to slip over a smaller end of the flexible inner liner as the flexible outer liner is installed onto the flexible inner liner.

7. The method of claim 1, wherein the flexible outer liner is characterized as an open planar sheet configured to be wrapped around the flexible inner liner and secured into a closed tube as the flexible outer liner is installed onto the flexible inner liner.

8. The method of claim 1, wherein the helically formed wire of the flexible inner liner is formed of metal, and wherein the flexible membrane of the flexible inner liner is formed of at least a selected one of plastic, cloth or polyester.

9. The method of claim 1, wherein the flexible outer liner comprises a protective layer to restrict leakage of the airflow along the tapered conduit and an insulation layer to provide acoustic baffling of the airflow along the tapered conduit, the insulation layer extending between the flexible inner liner and the protective layer.

10. The method of claim 9, wherein the insulation layer of the flexible outer liner is formed of at least a selected one of batting, cloth, fibers, plastic, rubber, foam or thermal insulation material, and wherein the protective layer is formed of a non-permeable material.

11. The method of claim 1, further comprising providing attachment mechanisms provided at opposing first and second ends end of the flexible outer liner to interconnect with the respective first end and the second end of the flexible inner liner and maintain the flexible inner liner in a desired configuration within the flexible outer liner.

12. The method of claim 1, wherein the maximum expanded length is from four feet to eight feet in length, and wherein the minimum retracted length is less than 25% of the maximum overall length.

13. The method of claim 1, further comprising:
removing the collapsed flexible outer liner from the interior of the collapsed flexible inner liner at the user location;
expanding the flexible inner liner to interconnect the inlet port to the outlet port by coupling a second end to a register extending along a boundary between a conditioned space and an unconditioned space, and by coupling a first end to a fan suspended within the unconditioned space; and
covering the flexible inner liner with the flexible outer liner.

14. The method of claim 13, wherein at least a selected one of the register or the fan has an associated register port or fan port, respectively, with a rectilinearly shaped cross-sectional area, and wherein the tapered conduit is further processed by mechanically transitioning a portion of the wire adjacent the associated first end or second end from an initial circularly shaped wire frame into a rectilinearly shaped wire frame and matingly engaging the associated register port or fan port having the rectilinearly shaped cross-sectional area.

15. The method of claim 1, wherein the constructing step comprises wrapping the wire about a last having an outermost frusto-conical surface sized to correspond to dimensions of the flexible inner liner, wrapping a layer of the flexible membrane about the outermost frusto-conical surface prior to or after the wire is wrapped thereabout, and using an adhesive to bond the wire to the flexible membrane.

16. The method of claim 1, wherein:
the destination location comprises a structure having a boundary that separates a conditioned space from an unconditioned space;
a fan assembly is disposed within the unconditioned space, the fan assembly comprising an electric motor, an exhaust port, and a series of rotatable impellers to establish an air flow through the exhaust port;
a register has a base portion which extends through the boundary which has a different cross-sectional area as compared to the exhaust port;
the tapered conduit is attached to the respective exhaust and inlet ports;
the wire is configured to continuously decrease an innermost diameter of the flexible inner liner so that the flexible inner liner tapers in a cross-sectional area along an overall length thereof;
the flexible inner liner is configured to be transitioned between a retracted orientation with the minimum retracted length and an expanded orientation with the maximum expanded length that is at least 50% greater than the minimum retracted length, each successive turn of the helically formed wire abutting an adjacent turn of the helically formed wire when transitioned to the retracted orientation; and
the tapered conduit is installed at the destination location by steps comprising removing and expanding the flexible outer liner, expanding the flexible inner liner, mechanically attaching respective ends of the expanded flexible inner liner to the inlet and exhaust ports, and covering the expanded flexible inner liner with the expanded outer liner.

17. The method of claim 16, wherein the tapered conduit, the fan assembly and the register form a portion of a whole house fan (WHF) ventilation system for use in a residential structure, wherein the conditioned space comprises an interior habitable space of the residential structure serviced by an HVAC (heating, ventilation and air conditioning) system, and wherein the unconditioned space comprises at least a selected one of an attic space or a garage space of the residential structure.

18. The method of claim 1, wherein at least a selected one of the flexible inner liner or the flexible outer liner comprises a layer of non-permeable material.

19. The method of claim 1, further comprising providing attachment mechanisms at opposing first and second ends end of the flexible outer liner to interconnect with respective first and second ends of the flexible inner liner and maintain the flexible inner liner in a desired configuration within the flexible outer liner.

20. The method of claim 1, wherein the flexible outer liner is characterized as a closed tapered sleeve.

21. The method of claim 1, wherein the flexible outer liner is characterized as an open planar sheet.

22. The method of claim 16, wherein each of the inlet port of the register and the exhaust port of the fan assembly are cylindrically shaped, and wherein respective ends of the tapered conduit have circular cross-sectional shapes sized for mating attachment with the cylindrically shaped inlet and exhaust ports using a fastening mechanism.

23. The method of claim 16, wherein at least a selected one of the inlet port of the register or the exhaust port of the fan assembly has a rectilinear shape, and wherein the tapered conduit is further installed by steps comprising mechanically shaping a portion of the wire adjacent the selected one of the inlet or exhaust port into a rectilinear wire frame and matingly engaging the portion onto the selected one of the inlet or exhaust port having the rectilinear shape.

\* \* \* \* \*